United States Patent [19]

Durrant et al.

[11] Patent Number: 4,656,335
[45] Date of Patent: Apr. 7, 1987

[54] START-UP CONTROL SYSTEM AND VESSEL FOR LMFBR

[75] Inventors: Oliver W. Durrant, Akron; Chandrasekhara R. Kakarala, Clinton, both of Ohio; Sheldon W. Mandel, Galesburg, Ill.

[73] Assignee: The Babcock & Wilcox Company, New Orleans, La.

[21] Appl. No.: 495,190

[22] Filed: May 16, 1983

[51] Int. Cl.[4] .......................... F22B 1/28; F22B 27/16
[52] U.S. Cl. ..................................... 219/271; 219/273; 219/314
[58] Field of Search ............... 219/271, 272, 273, 275, 219/276, 314, 341; 122/31 R, 33, 34

[56] References Cited

U.S. PATENT DOCUMENTS

| | | | |
|---|---|---|---|
| 1,399,175 | 12/1921 | White | 219/314 |
| 2,869,760 | 1/1959 | Karlen | 219/314 |
| 3,103,206 | 9/1963 | Halvorsen | 122/34 |
| 3,267,907 | 8/1966 | Glausser | 122/34 |
| 3,894,396 | 7/1975 | Durrant | 60/665 |
| 3,992,607 | 11/1976 | Jolin | 219/314 |
| 4,018,263 | 4/1977 | Ulano | 122/31 R |
| 4,061,533 | 12/1977 | Durrant | 176/20 R |
| 4,140,104 | 2/1979 | Itagaki | 219/314 |
| 4,430,555 | 2/1984 | Stokes | 219/273 |

FOREIGN PATENT DOCUMENTS

| | | | |
|---|---|---|---|
| 1570420 | 6/1969 | France | 219/341 |
| 606694 | 8/1948 | United Kingdom | 122/37 |

Primary Examiner—Clarence L. Albritton
Assistant Examiner—Teresa J. Walberg
Attorney, Agent, or Firm—Vytas R. Matas; Robert J. Edwards

[57] ABSTRACT

A reflux condensing start-up system includes a steam generator, a start-up vessel connected parallel to the steam generator, a main steam line connecting steam outlets of the steam generator and start-up vessel to a steam turbine, a condenser connected to an outlet of the turbine and a feedwater return line connected between the condenser and inlets of the steam generator and start-up vessel. The start-up vessel has one or more heaters at the bottom thereof for heating feedwater which is supplied over a start-up line to the start-up vessel. Steam is thus generated to pressurize the steam generator before the steam generator is supplied with a heat transfer medium, for example liquid sodium, in the case of a liquid metal fast breeder reactor. The start-up vessel includes upper and lower bulbs with a smaller diameter mid-section to act as water and steam reservoirs. The start-up vessel can thus be used not only in a start-up operation but as a mixing tank, a water storage tank and a level control at low loads for controlling feedwater flow.

6 Claims, 2 Drawing Figures

START-UP CONTROL SYSTEM AND VESSEL FOR LMFBR

FIELD AND BACKGROUND OF THE INVENTION

The present invention relates, in general, to the control of processes for generating steam and, in particular, to a new and useful reflux condensing start-up system and vessel particularly for liquid metal fast breeder reactors.

The control and operation of nuclear reactors, in particular, liquid metal fast breeder reactors(LMFBR) is disclosed in Proceedings of the Third Power Plant Dynamics, Control and Testing Symposium, T. W. Kerlin Edgar, U. of Tenn. 1977, papers 8, 17, 19 and 20.

These papers disclose various approaches to the control of such reactors and the response of such reactors to various normal and abnormal conditions.

Schemes for controlling both nuclear and conventional steam generating reactors are also disclosed in U.S. Pat. Nos. 3,894,396 issued July 15th, 1975 and 4,061,533 issued Dec. 6th, 1977 both to Durrant. These two patents are incorporated here by reference.

Steam generating reactors and, in particular, nuclear reactors, require careful handling and control during start-up operations which bring the steam generating equipment from ambient conditions up to full pressure and output.

SUMMARY OF THE INVENTION

The present invention provides for a start-up system with a start-up vessel which is used in conjunction with a steam generator to initially flush and then pressurize the steam generator for use in generating steam to drive a turbine or other steam using equipment.

According to the invention, an immersion heater is used at a lower portion of the start-up vessel to generate steam from feedwater supplied to the bottom of the vessel, which steam is utilized to pressure the system.

The invention eliminates, in a once-through steam generator, the conventional circulation during initial stages of the warm-up or start-up regime. Additionally, well-defined and easy to establish water level locations during start-up, shut-down and other low situations can be obtained, thereby avoiding the conventional need for feedwater flow control. Steam generation for start-up can be provided through any source of heat, such as electric, gas, oil, or the like. The inventive system provides an efficient reflux condenser with condensation occurring at all tube side heat transfer surfaces in the steam generator.

The start-up vessel according to the invention can provide multiple function such as those of a mixing tank, a water storage tank and a level control for feedwater at low loads.

According to the invention, it is never necessary to circulate water within the system, including the main steam line for start-up, thereby eliminating the problem of water carryover to the steam turbine.

The use of a resistor-type level control static pressure equalization line between the vessel and the main steam line is also provided, where it is possible to leave the static pressure equalization line open at all times.

Venting of non-condensibles from the system is facilitated by the use of a primary heat source to drive the heavier gases (air, etc.) out of the system.

The basic start-up vessel configuration is flexible and can be optimized to reduce cost, increase water storage and reap other benefits.

When used with a once-through steam generator design, the inventive start-up system acts like a pot boiler and performs on line as a once-through boiler.

The start-up vessel according to the invention includes upper and lower bulbs with a smaller diameter mid-section defining an inner space for feedwater and steam. The upper bulb volume provides water storage to minimize difficulties during transients. Direct contact auxiliary feedwater heating is accomplished using a by-pass line off the main steam line which is provided through the upper bulb of the vessel, thereby assuring the high feedwater temperature necessary for a sodium heated steam generator.

Accordingly, an object of the present invention is to provide a start-up vessel for a reflux condensing start-up system comprising, a lower bulb defining a lower space, an upper bulb defining an upper space, a mid-section of a cross-section less than that of the upper and lower bulbs, which defines a midspace and connects the upper and lower bulbs and heating means associated with the lower bulbs for heating water in the lower space. At least one inlet conduit connected to the vessel for supplying feedwater thereto with at least one outlet connected to the vessel for tapping steam. The vessel would be designed in accordance with the ASME Boiler and Prssure vessel code, section III.

Another object of the invention is to provide a reflux condensing start-up system which comprises a steam generator having a heat-transfer fluid inlet for admitting heat transfer fluid such as liquid sodium, a heat transfer fluid outlet for discharging the heat transfer fluid, a feedwater inlet for admitting water and a steam outlet for discharging steam. The system includes the start-up vessel set forth above with the steam outlets of the steam generator and start-up vessel being connected to a main steam line that, in turn, is connected to the inlet of a steam turbine. A steam condenser is connected to the outlet of the steam turbine and a feedwater piping and regenerative feedwater heater system is provided between the condenser and the feedwater inlet of the steam generator. At least one pump is provided in the feedwater line to circulate feedwater with a start-up line connected between the feedwater line at a point of connection which is downstream of the pump, and the line connecting the outlet of the turbine to the inlet of the condenser. Valves are provided at the inlet and outlet of the start-up vessel for connecting the vessel into the system and isolating the vessel from the system at appropriate times. Valves are also provided in the feedwater line just upstream of the steam generator inlet for isolating the steam generator from the system during start-up. By appropriate control of the valves and the heater in the start-up vessel, feedwater can first be used to flush the system and then to supply water to the start-up vessel where it is heated to generate steam. The steam is utilized to warm up and begin the turbine rolling, and also to pressurize the steam generator which is thereafter supplied with feedwater to be heated by the heat transfer fluid supplied from a reactor.

A still further object of the invention is to provide a reflux condensing start-up system and vessel which are simple in design, rugged in construction and economical to manufacture.

For an understanding of the principles of the invention, reference is made to the following description of a typical embodiment thereof as illustrated in the accompanying drawings.

DESCRIPTION OF THE PREFERRED EMBODIMENT

Figure 1:
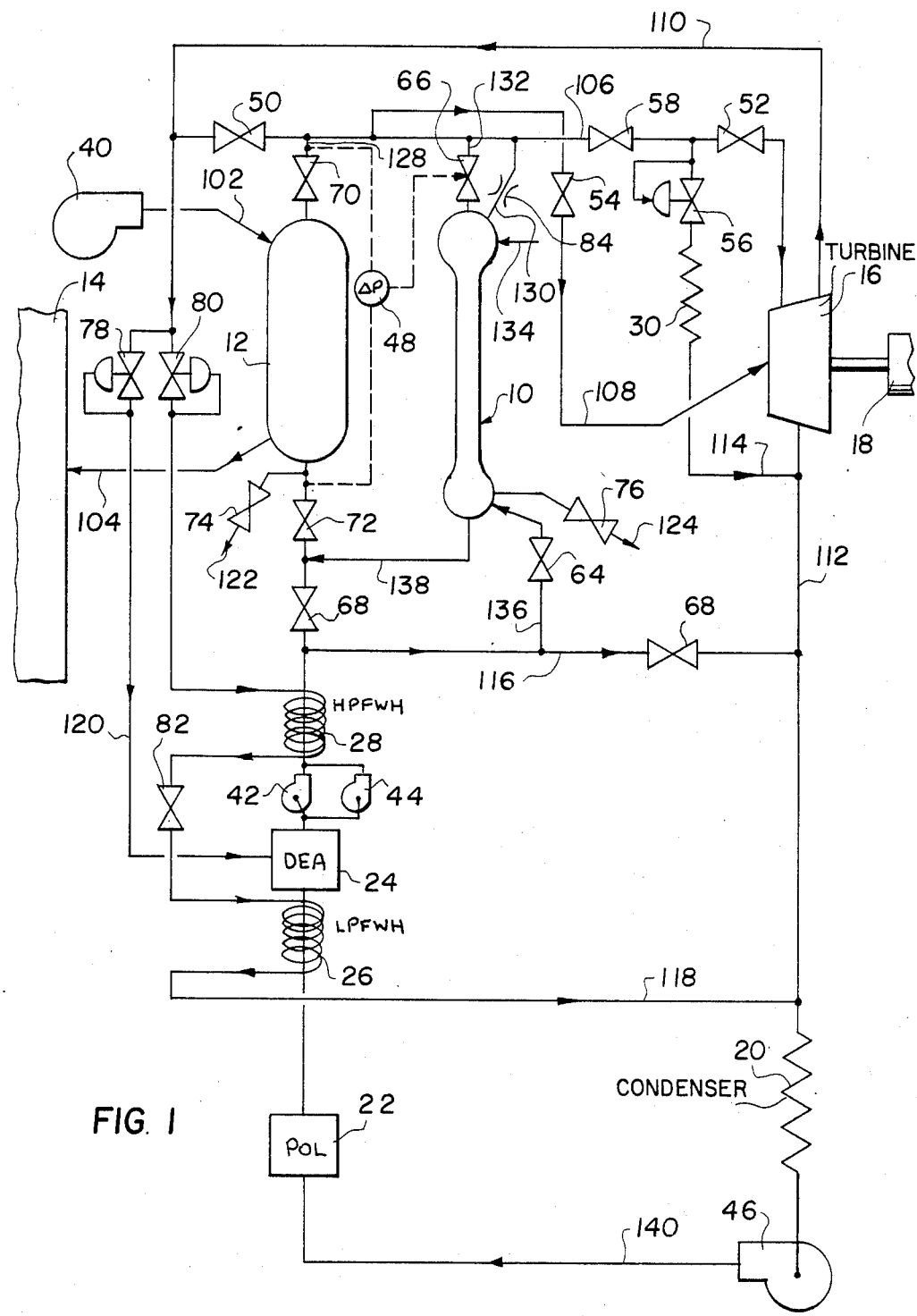
FIG. 1 is a schematic representation of a start-up system according to the invention.
Figure 2:
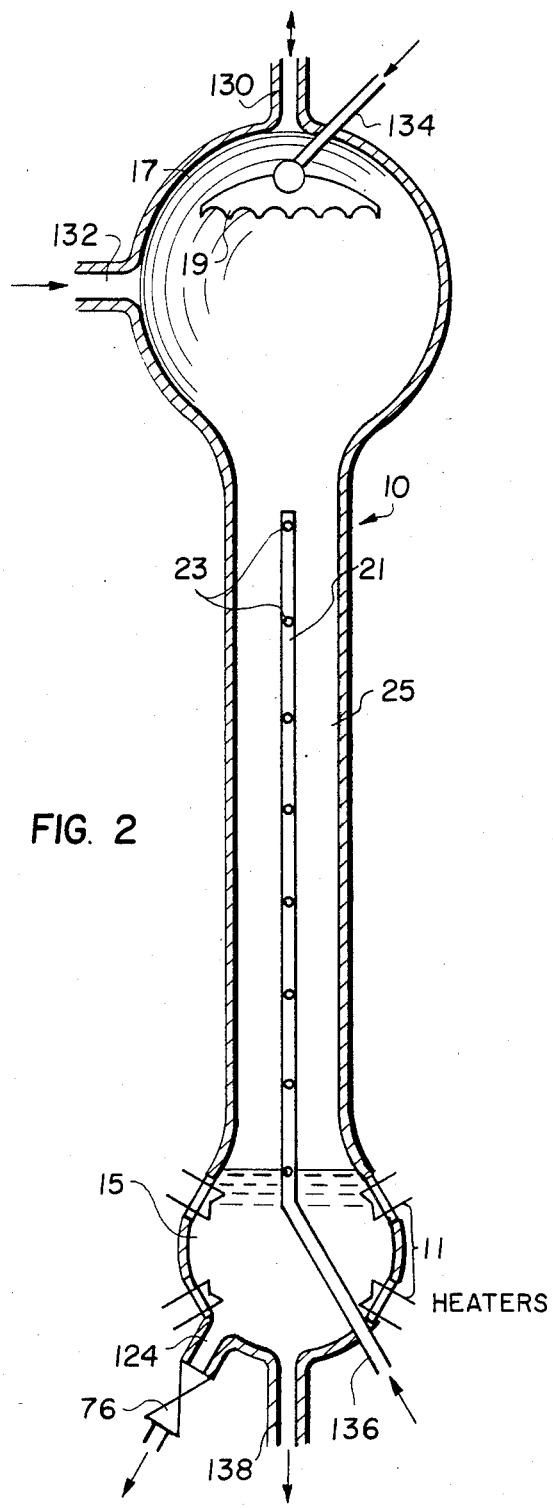
FIG. 2 is a side elevational view of the start-up vessel according to the invention.

Referring to the drawings, in particular, the invention embodied therein comprises a reflux condensing start-up system shown in FIG. 1 which includes a start-up vessel 10 having inlets and outlets connected to inlets and outlets of a steam generator 12. As shown in FIG. 2, one or more immersion heaters 11 are provided in the lower end of vessel 10. These immersion heaters may be of any suitable type for generating steam from feedwater which is also supplied to the vessel. Alternatively, steam lines or any other source of heat can be provided at locations 11.

After start-up, heat is supplied to the steam generator by a reactor 14 which, in particular, may of the Liquid Metal Fast Breeder Reactor (LMFBR) type. Heat transfer fluid, for example liquid sodium, is provided over a heat transfer fluid inlet line 102 and pumped by a sodium pump 40. The sodium transfers its heat to water moving in independent conduits in steam generator 12 and then is discharged over heat transfer fluid outlet line 104. The steam generated in start-up vessel 10 or steam generator 12 is provided over a main steam line 106 to a turbine 16. Turbine 16 may drive a shaft which is connected to an electric generator 18, for example.

Steam used in turning turbine 16 is transported over a turbine outlet or condenser inlet line 112 to the condenser 20. The condensate and feedwater system line 140 connects the outlet of condenser 20 to the feedwater inlet line 126 of steam generator 12. The condensate and feedwater system line 140 includes a condenser pump 46 for pumping the feedwater, a polisher 22 for removing impurities from the feedwater, a low pressure feedwater heater 26, a deaerator 24, parallel connected main and start-up feedwater pumps 42 and 44, respectively, a high pressure feedwater heater 28, a steam generator feedwater control valve 68 and a steam generator inlet isolation valve 72. A steam outlet line 128 connects the steam outlet of steam generator 12 to main steam line 106, with isolation valve 70 provided for controlling the passage of steam from the steam generator 12 during full operation and the passage of steam to steam generator 12 during start-up operations.

A feedwater flow and vessel lever controller 48 is connected to the inlets and outlets of steam generator 12 and has a control connection to a start-up vessel outlet valve 66 which is disposed in start-up vessel steam outlet line 132. Controller 48 controls the level in both steam generator 12 and start-up vessel 10 when they are interconnected.

A start-up line 116 for feedwater is connected between the main feedwater line 140 at a point of connection downstream of all of the pumps, and the condenser inlet lines 112. Start-up line valve 62 is disposed in line 116.

Start-up vessel 10 has a feedwater outlet line 138 connected at the bottom thereof to the main feedwater line 140 between valves 68 and 72. A feedwater inlet line 136 with start-up vessel inlet valve 64 is provided to the lower end of vessel 10. Vessel 10 is also provided with a blow-down line 124 having blow-down valves 76 therein. The upper end of vessel 10 is provided with a static pressure equalization line 130 that is connected to main steam line 106 and is provided with one or more flow restrictors 84 which, for example, may be throttles. Line 130 may remain open throughout the operation of the system. An auxiliary feedwater line 134 is also connected to the top of vessel 10.

Steam generator 12 includes a vent line 122 with vent valves 74.

A turbine prewarming line 108 connects a main steam line 106 to turbine 16 and includes a warm-up valve 54. A turbine by-pass line 114 also connects main steam line 106 to condenser inlet 112 and is provided with valve 56 and a desuper heater 30. Main steam line 106 includes main steam line valve 58 upstream of by-pass line 114 and turbine stop valve 52 downstream of line 114. Condenser inlet line 112 is provided at a location downstream of the connection with by-pass line 114.

To supply steam for low and high pressure feedwater heaters 26, 28, as well as deaerator 24, steam is extracted from turbine 16 over multiple steam extraction line(s) 110 which is provided with high pressure feedwater heater inlet valve 80 and heater drain valve(s) 82. One extraction line 110 is the deaerator line 120 with deaerator inlet valve 78. If additional steam is necessary to maintain the feedwater temperature at the desired level for the sodium circulation system, an extraction line valve 50 may be opened to provide steam from main steam line 106 directly to extraction line(s) 110. After the steam has passed low pressure feedwater heater 26, it is returned through the feedwater heater drain line 118 back to the condenser inlet line 112.

Referring now to FIG. 2, the start-up vessel 10 is shown with its various connections to the system of FIG. 1.

Vessel 10 includes a lower bulb 15 which is connected to an upper bulb 17 over a midsection 25 having a smaller cross-sectional diameter than the diameters of either the lower or upper bulbs. Auxiliary feedwater line 134 is connected to one or more nozzles 19 which can spray water in the upper bulb 17 and is preferably positioned at the lower portion of upper bulb 17 for maximum pressure differential. Feedwater is provided over line 136 extending through lower bulb 15, up into a distribution line 21 which has a plurality of spaced openings 23 for distributing feedwater in mid-section 25 and lower bulb 15.

The start-up vessel through valves 64 and 66 can be isolated and removed from the system as can the steam generator 12 using valves 72 and 70.

The physical height of the start-up vessel 10 is of size to provide any desired maximum static head capacity with the point of connection of feedwater inlet line 136 for vessel 10 being below the vent line 122. Distributor 21 is provided to permit effective mixing of incoming feed water with steam in the vessel. Generally, the elevation of the lower bulb of the vessel will be below the steam generator and the elevation of the upper shell of the vessel will be approximately the same as the steam generator.

The storage requirements for transients associated with the loss of feed water are provided in the bulb portions 15 and 17. Auxiliary feedwater which is introduced through spray nozzle or nozzles 19 comes into direct heat transfer contact with by-pass steam provided through line 132 when valve 66 is open. This structure thus provides protection when the main feedwater flow is interrupted.

During a normal scram, as is known in the prior art, the reactor 14 trips, the turbine 16 trips, and in turn the sodium pump or pumps 40 will trip. The system coasts down and pony motors (not shown) are operated. The main feed pump 44 also trips but start-up pump 42 is continued in its operation to feed water to start-up vessel 10. Static pressure equalization line 130 being maintained in its open condition prevents over-pressurization of vessel 10. If a valve is provided in line 130, this valve is immediately opened.

Feedwater flow is controlled through the start-up line 116 by valve 62 (normally closed) and 64 to maintain a level in start-up vessel 10 between a maximum and minimum position after mix level is achieved. At this point, the sodium inlet temperature is dictated by the reactor system. Steam outlet temperature follows the sodium inlet temperature. The sodium outlet temperature is limited by the feedwater inlet temperature and is determined by the minimum water level and the feedwater flow rate (i.e. power level). For a fixed level, sodium inlet temperature transient should be evaluated to determine the need for programmed water level. If necessary, the minimum water level to control the sodium outlet temperature transient is programmed.

Consideration can also be given to maintaining PRV pressure setting at a high level and ramping up the high pressure heater shell pressure to full load pressure. This is all for the purpose of delaying the loss of sodium temperature.

For normal start-up, the sequence of operations is as follows:

After the usual leakage testing for steam generator 12, valves 64 and 68 are closed with valve 62 being opened. Condensate pump 46 is operated to circulate feedwater through polisher 22 to bring the feed water to a required level of purity. Additional feedwater cleanup can occur during the warm-up operation.

Valves 64, 68 and 72 are then opened to admit a predetermined amount of feedwater to vessel 10 to a level which is below vent 122 of steam generator 12. Vent valve 74 is left open. Heaters 11 in vessel 10 are activated to heat water and generate steam. The steam generator is purged of heavier non-condensates such as air through vent line 122. When venting is completed, vent valve 74 is closed and heating continues. Feedwater is introduced to the steam generator 12 through valve 72 and it and the start-up vessel are maintained at minimum water level of operation. Heating takes place at the required rates with the steam generator acting as a reflux condenser for the steam generated in the start-up vessel.

When the start-up vessel and steam generator reach 300° F. (70 pis), turbine prewarming begins over line 10 with valve 54 open. Valve 50 is also opened to provide steam to high pressure feedwater heater 28 and the deaerator 24 at suitable predetermined pressure set points for valves 80 and 78, respectively. This requires make-up water to maintain the necessary start-up water level. The addition of make-up water is accomplished through the start-up line 116 by adjusting the setting of valve 62 and (normally closed) valve 64. During this phase, the start-up vessel is also utilized as a mixing tank. Auxiliary steam flow to the feed water heaters also begins at this point.

When at 400° F., sodium is introduced by pump 40 over line 102 into steam generator 12 and circulated at full load flow rate. Pump heat (and energy for immersion heaters 11) will continue to heat the system to 1,040 PSIA (550° F.) which will be used as the rolling pressure.

Upon achieving the rolling pressure, the reactor 14 is started and increased to about 8% power. Sodium flow rate is reduced from 100% to 24% (this will yield a 100° F. sodium in/out temperature difference). Sodium outlet temperature at line 104 is allowed to remain at 550° F., while the inlet temperature rises to 650° F. Letting the outlet steam come to 650° F. at 1046 psi, set the inlet feedwater temperature at 410° F. at a flow rate of 8% full flow.

The steam flow is split by opening valve 56 to a certain extent so that of the 8% steam being produced, approximately 3% of the full load flow goes to the turbine 16 over line 106 and valve 52 which is also opened, for roll-up and the remaining diverted to the condenser over line 114.

When the turbine comes to synchronous speed, in about one hour after start of roll, an 8% electric load is placed on the turbine generator 18 as the entire 8% steam flow is directed through the turbine by adjusting valves 56 and 52.

Conditions of pressure and temperature remain fixed until the load is increased to 15%. This is done by adjusting the turbine valves so that they are in the same position as they would be at a 40% load. To achieve this, the water flow will ramp up to 50% while the sodium flow will ramp up to 40 to 45%. Note that at about 15%–20% steam flow, the water level control will peak out and feed water flow is then controlled by reactor power and steam temperature (superheat). This takes about 30 minutes.

At 15% reactor power, all operation conditions will ramp to the design conditions of 40% of full load.

While a specific embodiment has been shown and described in detail to illustrate the application of the principles of the invention, it will be understood that the invention may be embodied otherwise without departing from such principles.

What is claimed is:

1. A start-up vessel for a start-up system suitable for liquid metal fast breeder reactors comprising:
   a lower bulb defining a lower space;
   an upper bulb defining an upper space;
   a mid-section of a cross-sectional diameter less than that of said lower and upper bulbs, defining a mid-space and connected between said upper and lower bulbs;
   heating means associated with said lower bulb for heating water in said lower space;
   at least one inlet conduit connection connected to said vessel for admitting feed water to said lower space to be heated by said heating means to produce steam;
   at least one outlet conduit connection connected to said vessel for discharging steam;
   an auxiliary feed water line connected through said upper bulb having at least one nozzle at the end thereof for spraying feed water into said upper space; and
   a main steam inlet connection connected to said upper bulb for heating said auxiliary feed water to produce steam.

2. A vessel according to claim 1, wherein said lower bulb is of a smaller diameter than said upper bulb with both said upper and lower bulbs being generally spherical in shape.

3. A vessel according to claim 1, wherein said heating menas comprises a plurality of immersion heaters extending into said lower space.

4. A vessel according to claim 1, wherein said inlet conduit connection comprises a feedwater line extending through said lower bulb, a distribution line extending upwardly from said feedwater line into said mid-space having a plurality of openings, vertically distributed therealong for admixing feed water supply through said feed water line with steam in said upper, lower and mid-space.

5. A vessel according to claim 4, wherein said outlet conduit connection is a static pressure equalization line connection connected to said upper bulb.

6. A vessel according to claim 5, including a blow-down line connection connected to said lower bulb and a feed water drain connection connected to said lower bulb.

* * * * *